United States Patent
Hou et al.

(10) Patent No.: US 12,211,417 B2
(45) Date of Patent: Jan. 28, 2025

(54) METHOD AND APPARATUS FOR DRIVING DISPLAY PANEL AND DISPLAY DEVICE

(71) Applicants: Beijing BOE Optoelectronics Technology Co., Ltd., Beijing (CN); BOE Technology Group Co., Ltd., Beijing (CN)

(72) Inventors: Yifan Hou, Beijing (CN); Tiankuo Shi, Beijing (CN); Zhihua Ji, Beijing (CN); Wei Sun, Beijing (CN); Xiaomang Zhang, Beijing (CN); Minglei Chu, Beijing (CN); Yan Sun, Beijing (CN); Shuo Zhang, Beijing (CN); Xiangjun Peng, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/913,289

(22) PCT Filed: Oct. 22, 2021

(86) PCT No.: PCT/CN2021/125622
§ 371 (c)(1),
(2) Date: Sep. 21, 2022

(87) PCT Pub. No.: WO2022/252477
PCT Pub. Date: Dec. 8, 2022

(65) Prior Publication Data
US 2024/0203314 A1 Jun. 20, 2024

(30) Foreign Application Priority Data
May 31, 2021 (CN) .......................... 202110601528.4

(51) Int. Cl.
*G09G 3/20* (2006.01)
*G06T 5/94* (2024.01)

(52) U.S. Cl.
CPC .............. *G09G 3/2074* (2013.01); *G06T 5/94* (2024.01); *G09G 2320/02* (2013.01);
(Continued)

(58) Field of Classification Search
CPC ............. G09G 3/2074; G09G 2320/02; G09G 2320/0233; G09G 2320/0242;
(Continued)

(56) References Cited

U.S. PATENT DOCUMENTS

| 2008/0075384 A1* | 3/2008 | Chung | ...................... G06T 5/94 |
|---|---|---|---|
| | | | 382/274 |
| 2009/0167957 A1* | 7/2009 | Joo | ........................... G06T 5/94 |
| | | | 348/E5.119 |

(Continued)

FOREIGN PATENT DOCUMENTS

| CN | 1197250 A | 10/1998 |
|---|---|---|
| CN | 104505043 A | 4/2015 |

(Continued)

OTHER PUBLICATIONS

First Office Action issued on Oct. 8, 2022 for application No. CN202110601528.4 with English translation attached.

*Primary Examiner* — Tom V Sheng
(74) *Attorney, Agent, or Firm* — Nath, Goldberg & Meyer; Joshua B. Goldberg (57) ABSTRACT

The present disclosure provides a A driving method of a display panel, including: determining a target region and a non-target region in the display panel; dividing the target region into a plurality of target sub-regions, and dividing the non-target region into a plurality of non-target sub-regions, wherein an area of the target sub-region is less than that of
(Continued)

the non-target sub-region; determining brightness compensation values of each target sub-region and each non-target sub-region according to a gray scale value of each pixel in an input image; determining a compensated brightness of each pixel unit in the display panel according to the gray scale value of each pixel in the input image, the brightness compensation values of each target sub-region and each non-target sub-region; and driving each pixel unit in the display panel to emit light according to the compensated brightness of each pixel unit in the display panel.

19 Claims, 3 Drawing Sheets

(52) U.S. Cl.
CPC .............. *G09G 2320/0233* (2013.01); *G09G 2320/0242* (2013.01); *G09G 2320/0271* (2013.01); *G09G 2320/0626* (2013.01); *G09G 2330/021* (2013.01)

(58) Field of Classification Search
CPC ... G09G 2320/0271; G09G 2320/0626; G09G 2330/021; G06T 5/94
USPC .......................................................... 345/55
See application file for complete search history.

(56) References Cited

U.S. PATENT DOCUMENTS

| | | | | |
|---|---|---|---|---|
| 2010/0053185 | A1* | 3/2010 | Hwang | G09G 3/2055 345/556 |
| 2010/0053204 | A1* | 3/2010 | Hwang | G09G 3/3648 345/618 |
| 2014/0240201 | A1* | 8/2014 | Takahashi | G09G 5/10 345/1.3 |
| 2015/0145894 | A1 | 5/2015 | Kim et al. | |
| 2016/0210912 | A1* | 7/2016 | Tada | G09G 3/3648 |
| 2019/0088193 | A1* | 3/2019 | Tada | G06F 3/04845 |
| 2021/0027723 | A1* | 1/2021 | Kang | G09G 3/3413 |
| 2021/0166654 | A1* | 6/2021 | Yu | G09G 3/2011 |
| 2021/0295789 | A1* | 9/2021 | Kang | G09G 3/3607 |
| 2021/0407446 | A1* | 12/2021 | Wang | G09G 3/3611 |
| 2024/0013696 | A1* | 1/2024 | Chang | G09G 3/2007 |

FOREIGN PATENT DOCUMENTS

| | | |
|---|---|---|
| CN | 106101533 A | 11/2016 |
| CN | 106531050 A | 3/2017 |
| CN | 108630148 A | 10/2018 |
| CN | 109637499 A | 4/2019 |
| CN | 109658900 A | 4/2019 |
| CN | 109712592 A | 5/2019 |
| CN | 109994073 A | 7/2019 |
| CN | 110277058 A | 9/2019 |
| CN | 112017590 A | 12/2020 |
| CN | 112233633 A | 1/2021 |
| CN | 112530346 A | 3/2021 |
| CN | 113314063 A | 8/2021 |
| JP | 2013229789 A | 11/2013 |
| WO | 2018070013 A1 | 4/2018 |

* cited by examiner

METHOD AND APPARATUS FOR DRIVING DISPLAY PANEL AND DISPLAY DEVICE

This is a National Phase Application filed under 35 U.S.C. 371 as a national stage of PCT/CN2021/125622, filed on Oct. 22, 2021, an application claiming the priority of the Chinese Patent Application No. 202110601528.4 entitled "method and apparatus for driving display panel and display device" filed on May 31, 2021, the content of each of which is hereby incorporated by reference in its entirety.

TECHNICAL FIELD

The present disclosure relates to the field of display technology, and in particular, to a driving method of a display panel, a driving apparatus for performing the driving method, and a display device including the driving apparatus.

BACKGROUND

Due to the limitation of the manufacturing process, an actual brightness of a display panel when displaying cannot reach the same level as a theoretical brightness of an image input into the display panel. For example, an image with a brightness A is intended to be displayed, and the display panel can only achieve a display with a brightness B (where A≠B).

It is always an objective in the art to make the display brightness of the display panel consistent with the theoretical brightness of the input image.

SUMMARY

An object of the present disclosure is to provide a driving method of a display panel, a driving apparatus performing the driving method, and a display device including the driving apparatus.

As a first aspect of the present disclosure, it is provided a driving method of a display panel, including:
  determining a target region and a non-target region in the display panel;
  dividing the target region into a plurality of target sub-regions, and dividing the non-target region into a plurality of non-target sub-regions, wherein an area of each of the plurality of target sub-regions is less than an area of each of the plurality of non-target sub-regions;
  determining a brightness compensation value of each of the plurality of target sub-regions and a brightness compensation value of each of the plurality of non-target sub-regions according to a gray scale value of each pixel in an input image;
  determining a compensated brightness of each pixel unit in the display panel according to the gray scale value of each pixel in the input image, the brightness compensation value of each of the plurality of target sub-regions and the brightness compensation value of each of the plurality of non-target sub-regions; and
  driving each pixel unit in the display panel to emit light according to the compensated brightness of the pixel unit in the display panel.

Alternatively, the target region is a human eye gazing region.

Alternatively, the determining the target region and the non-target region in the display panel includes:
  acquiring position coordinates of a human eye gazing point on the display panel;
  determining the target region according to the position coordinates of the human eye gazing point, wherein the target region includes the human eye gazing point; and
  taking a region in the display panel other than the target region as the non-target region.

Alternatively, where the driving method adopts forward scanning, a row number of a first row of pixel units in the target region is:

$$L1 = 2 \times L\min \times Y;$$

where the driving method adopts reverse scanning, the row number of the first row of pixel units in the human eye gazing region is:

$$L1 = M - 2 \times L\min \times Y - L0,$$

where L1 is a row number of the first row of pixel units in the gazing region;
Lmin is the number of rows of pixel units occupied by the human eye gazing point;
Y is a row number of a pixel unit corresponding to a central position of the human eye gazing point;
L0 is the number of rows of pixel units occupied by the target region; and
M is a total number of rows of pixel units in the display panel.

Alternatively, the first row of pixel units in the target region is an $A^{th}$ row of pixel units,
  driving pixel units in a non-target region including the first row of pixel units to an $(A-1)^{th}$ row of pixel units to emit light includes:
  sequentially providing a scanning signal to N number of pixel unit groups in the non-target region including the first row of pixel units to the $(A-1)^{th}$ row of pixel units, wherein each of the N number of pixel unit groups includes n rows of pixel units, $1<n<A-1$, $N=(A-1)/n$, and n, N and A are all positive integers; and
  providing gray scale signals corresponding to the compensated brightness of the pixel units in the non-target region including the first row of pixel units to the $(A-1)^{th}$ row of pixel units.

Alternatively, a last row of pixel units in the target region is a $B^{th}$ row of pixel units,
  driving pixel units in the non-target region including a $(B+1)^{th}$ row of pixel units to a $M^{th}$ row of pixel units to emit light includes:
  sequentially providing a scanning signal to P number of pixel unit groups in the non-target region including the $(B+1)^{th}$ row of pixel units to the $M^{th}$ row of pixel units, wherein each of the P number of pixel unit groups includes p rows of pixel units, $1<p<M-B-1$, $P=(M-B-1)/p$, M, P, B, p are all positive integers, and M is a total number of rows of pixel units in the display panel; and
  providing gray scale signals corresponding to the compensated brightness of the pixel units in the non-target region including the $(B+1)^{th}$ row of pixel units to the $M^{th}$ row of pixel units.

Alternatively, for a pixel in the input image with a gray scale value exceeding a first predetermined value, a brightness compensation value of a corresponding light-emitting unit in the display panel is 0.

Alternatively, for a pixel in the input image with a gray scale lower than a second predetermined value, a brightness compensation value of a corresponding light-emitting unit in the display panel is 0.

Alternatively, the driving method further includes: before the step of determining the target region and the non-target region in the display panel, determining brightness compensation values corresponding to a plurality of gray scale value intervals, respectively, wherein a full gray scale is divided into the plurality of gray scale value intervals, and the plurality of gray scale value intervals are consecutive; and determining a mapping relationship between each of the plurality of gray scale value intervals and the brightness compensation value, according to the brightness compensation values corresponding to the plurality of gray scale value intervals, wherein in the determining the brightness compensation value of each of the plurality of target sub-regions and the brightness compensation value of each of the plurality of non-target sub-regions according to the gray scale value of each pixel in the input image, the brightness compensation value of each of the plurality of target sub-regions and the brightness compensation value of each of the plurality of non-target sub-regions are determined according to the gray scale value interval where the gray scale value of each pixel is located and the mapping relationship.

As another aspect of the present disclosure, it is provided a driving apparatus, including:

a screen partition module configured to determine a target region and a non-target region in a display panel;

a sub-region division module configured to divide the target region into a plurality of target sub-regions, and divide the non-target region into a plurality of non-target sub-regions, wherein an area of each of the plurality of target sub-regions is less than an area of each of the plurality of non-target sub-regions;

a brightness compensation value determination module configured to determine a brightness compensation value of each of the plurality of target sub-regions and a brightness compensation value of each of the plurality of non-target sub-regions according to a gray scale value of each pixel in an input image;

a brightness determination module configured to determine a compensated brightness of each pixel unit in the display panel according to the gray scale value of each pixel in the input image, the brightness compensation value of each of the plurality of target sub-regions and the brightness compensation value of each of the plurality of non-target sub-regions; and a photoelectric conversion module configured to drive each pixel unit in the display panel to emit light according to the compensated brightness of the pixel unit in the display panel.

Alternatively, the screen partition module includes:

a gazing point determination unit configured to acquire position coordinates of a human eye gazing point on the display panel; and a screen partition unit configured to determine the target region according to the position coordinates of the human eye gazing point and take a region in the display panel other than the target region as the non-target region, wherein the target region includes the human eye gazing point.

Alternatively, the screen partition unit is configured to determine the target region according to the following principle:

where the driving method adopts forward scanning, a row number of a first row of pixel units in the target region is:

$L1 = 2 \times Lmin \times Y;$ where the driving method adopts reverse scanning, the row number of the first row of pixel units in the gazing region is:

$L1 = M - 2 \times Lmin \times Y - L0,$ where L1 is a row number of the first row of pixel units in the human eye gazing region;

Lmin is the number of rows of pixel units occupied by the human eye gazing point;

Y is a row number of a pixel unit corresponding to a central position of the human eye gazing point;

L0 is the number of rows of pixel units occupied by the target region; and

M is a total number of rows of pixel units in the display panel.

Alternatively, the first row of pixel units of the target region is an $A^{th}$ row of pixel units, the driving apparatus includes a scan module configured to provide a scanning signal to each row of pixel units, wherein for the non-target region including the first row of pixel units to an $(A-1)^{th}$ row of pixel units, the scan module is configured to sequentially provide the scanning signal to N number of pixel unit groups, where each of the N number of pixel unit groups includes n rows of pixel units, $1 < n < A-1$, $N = (A-1)/n$, and n, N and A are all positive integers.

Alternatively, a last row of pixels in the target region is a $B^{th}$ row of pixel units, the driving apparatus includes a scan module configured to provide a scanning signal to each row of pixel units, wherein for the non-target region including a $(B+1)^{th}$ row of pixel units to a $M^{th}$ row of pixel units, the scan module is configured to sequentially provide the scanning signal to P number of pixel unit groups, where each of the P number of pixel unit groups includes p rows of pixel units, $1 < p < M-B-1$, $P = (M-B-1)/p$, M, P, B, p are all positive integers, and M is a total number of rows of pixel units in the display panel.

Alternatively, for a pixel in the input image with a gray scale value exceeding a first predetermined value, a brightness compensation value of a corresponding light-emitting unit in the display panel is 0; and/or for a pixel in the input image with a gray scale lower than a second predetermined value, a brightness compensation value of a corresponding light-emitting unit in the display panel is 0.

Alternatively, the driving apparatus further includes a mapping relationship determination module configured to determine the brightness compensation values corresponding to a plurality of gray scale value intervals, and determine a mapping relationship between each of the plurality of gray scale value intervals and the brightness compensation value, according to the brightness compensation value corresponding to each of the plurality of gray scale value intervals, wherein a full gray scale is divided into the plurality of gray scale value intervals, and the plurality of gray scale value intervals are consecutive; and the photoelectric conversion module is configured to determine the brightness compensation value of each of the plurality of target sub-regions and the brightness compensation value of each of the plurality of non-target sub-regions according to the gray scale value interval where the gray scale value of each pixel is located and the mapping relationship.

As a third aspect of the present disclosure, it is provided a display device, including:
a display panel; and
a driving apparatus, which is the driving apparatus described above.

BRIEF DESCRIPTION OF DRAWINGS

The accompanying drawings, which are included to provide a further understanding of the present disclosure and constitute a part of this specification, serve to explain the present disclosure together with the following detailed description, but do not constitute a limitation of the present disclosure. The above and other features and advantages will become more apparent to one of ordinary skill in the art by describing detailed examples with reference to the accompanying drawings, in which.

DETAIL DESCRIPTION OF EMBODIMENTS

In order to enable one of ordinary skill in the art to better understand the technical solutions of the present disclosure, a driving method of a display panel, a driving apparatus, and a display device provided by the present disclosure are described in detail below with reference to the accompanying drawings.

Exemplary embodiments will be described more fully hereinafter with reference to the accompanying drawings, but may be embodied in different forms and should not be construed as limited to the embodiments set forth herein. Rather, these embodiments are provided so that this disclosure will be thorough and complete, and will fully convey the scope of the present disclosure to one of ordinary skill in the art.

The embodiments of the present disclosure and features in the embodiments may be combined with each other without conflict.

As used herein, the term "and/or" includes any and all combinations of one or more of the associated listed items.

The term used herein is for the purpose of describing particular embodiments only and is not intended to limit the present disclosure. As used herein, the singular forms "a", "an" and "the" are intended to include the plural forms as well, unless the context clearly indicates otherwise. As used herein, the term "comprises", "comprising" and/or "made of . . . ", specifies the presence of stated features, integers, steps, operations, elements, and/or components, but do not preclude the presence or addition of one or more other features, integers, steps, operations, elements, components, and/or groups thereof.

The embodiments of the present disclosure may be described with reference to plan and/or cross-sectional views by way of idealized schematic illustrations of the present disclosure. Accordingly, the example illustrations may be modified in accordance with manufacturing techniques and/or tolerances. Accordingly, the embodiments of the present disclosure are not limited to the embodiments shown in the drawings, but include modifications of configurations formed based on a manufacturing process. Thus, the regions illustrated in the figures have schematic properties, and the shapes of the regions shown in the figures illustrate specific shapes of regions of elements, but are not intended to be limiting.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In order to realize that a display brightness of a display panel is consistent with a theoretical brightness of an input image, light compensation may be performed on pixel units of the display panel. For example, for a gray scale value of a pixel in an input image (corresponding to a theoretical brightness of the pixel), a theoretical driving voltage for driving a corresponding pixel unit in the display panel is V. In an ideal case, under the driving of the theoretical driving voltage V, a light-emitting brightness of the pixel unit completely coincides with the theoretical brightness of the corresponding pixel. However, under the influence of the manufacturing process, the light-emitting brightness of the pixel unit does not coincide with the theoretical brightness of the corresponding pixel. In this case, if the light-emitting brightness of the pixel unit is further compensated, a brightness equivalent to the theoretical brightness may be obtained.

In order to make an actual brightness of the pixel unit in the display panel closer to or almost equal to the corresponding theoretical brightness, when calculating the theoretical driving voltage, not only the gray scale value of the pixel in the input image is considered, but also a compensation value of the light-emitting brightness of the pixel unit is considered.

In order to make an image displayed in the display panel coincide with the input image as a whole, all the pixel units of the display panel may be subjected to brightness compensation one by one. However, performing brightness compensation for all pixel units of the display panel one by one increases an amount of calculation during driving the display panel, and has high requirements on a buffer (flash) space of the display device including the display panel and a calculation capability of a driving chip, which increases an overall cost of the display device.

Figure 1:
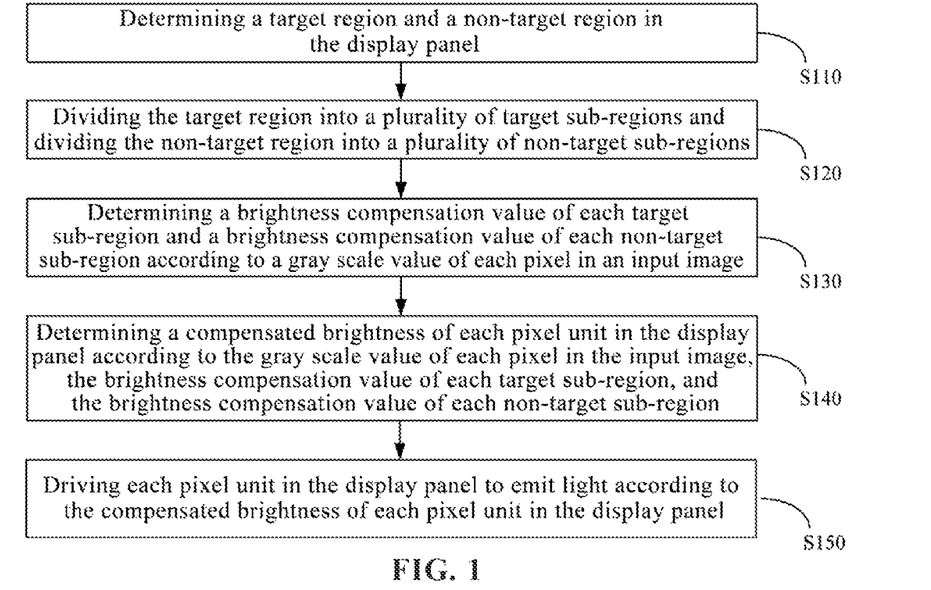
FIG. 1 is a flow chart of a driving method according to an embodiment of the present disclosure.

In view of this, as one aspect of the present disclosure, a driving method of a display panel is provided. As shown in FIG. 1, the driving method includes:

In step S110, determining a target region and a non-target region in the display panel;

In step S120, dividing the target region into a plurality of target sub-regions and dividing the non-target region into a plurality of non-target sub-regions, wherein an area of the target sub-region is less than an area of the non-target sub-regions;

In step S130, determining a brightness compensation value of each target sub-region and a brightness compensation value of each non-target sub-region according to a gray scale value of each pixel in an input image;

In step S140, determining a compensated brightness of each pixel unit in the display panel according to the gray scale value of each pixel in the input image, the brightness compensation value of each target sub-region, and the brightness compensation value of each non-target sub-region; and In step S150, driving each pixel unit in the display panel to emit light according to the compensated brightness of each pixel unit in the display panel.

With the driving method, a difference between the display gray scale of each pixel unit in the display panel and the gray scale of a corresponding pixel in the input image does not exceed a predetermined value, and preferably, the display gray scale of each pixel unit in the display panel is the same as the gray scale of the corresponding pixel in the input image.

In the driving method provided by the present disclosure, the target region is a region having a relatively high demand for display accuracy, and the non-target region is a region having a relatively low demand for display accuracy. In the driving method, light compensation to the display panel is performed in units of a target sub-region and a non-target sub-region. The brightness compensation values corresponding to all the pixel units in the same target sub-region are the same, and the brightness compensation values corresponding to all the pixel units in the same non-target sub-region are the same. Since the area of the target sub-region is relatively small, the target region is divided relatively finely, so that the target region can be subjected to relatively fine light compensation, and the display effect of the target region is closer to a part in the input image corresponding to the target region. Since the area of the non-target sub-region is relatively large, the non-target region is not divided finely; however, the light compensation of the non-target region can still be achieved. When the light compensation is performed on the non-target region, light compensation parameters called by a same non-target sub-region are the same, so that the number of the parameters called by the whole non-target region is less, a buffer can be less occupied, an operation speed of the driving method is increased, and the efficiency is further improved.

Figure 2:
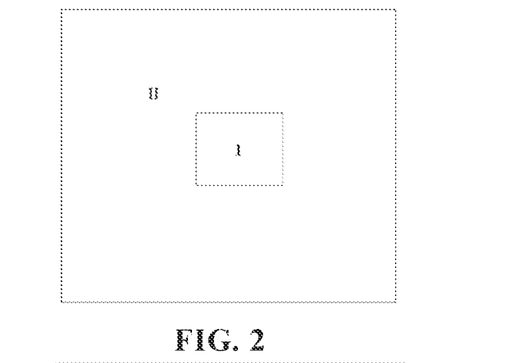
FIG. 2 is a schematic diagram showing a target region and a non-target region.

FIG. 2 is a schematic diagram illustrating a relative position relationship between a target region and a non-target region in a display panel. In the figure, reference numeral "I" denotes a target region, and reference numeral "II" denotes a non-target region.

Figure 3:
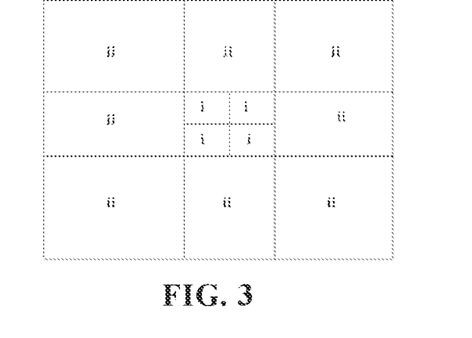
FIG. 3 is a schematic diagram showing a target sub-region and a non-target sub-region.

FIG. 3 is a schematic diagram of the target region divided into four target sub-regions i and the non-target region divided into eight non-target sub-regions ii. In the embodiment shown in FIG. 3, an area of the target sub-region i is less than an area of the non-target sub-region ii.

It should be noted that, when the target region is divided into the target sub-regions, the principle that the theoretical brightness (or gray scales) of the pixels in the input image corresponding to the pixel units in a same target sub-region is not much different should be followed, so that a same target sub-region can be compensated with a same brightness compensation value.

In the present disclosure, how to select the target region is not particularly limited. As an alternative embodiment, a portion of the display panel for displaying an image subject in the input image may be taken as the target region. For example, when the input image is a person in a certain background, a portion of the display panel for displaying the "person" may be taken as the target region. As another embodiment, a region designated by a viewer may be taken as a target region. For example, the viewer may specify the target region in the display panel through an input device (e.g., any one or several of a keyboard, a mouse, a touch screen).

As a further embodiment, the target region may be a human eye gazing region. When displaying, a region where human eyes gaze is taken as the target region to perform a fine light compensation, and a region where human eyes do not gaze is taken as the non-target region to carry out a rough light compensation, so that a visual perception of the viewer can be improved, a buffer during driving the display panel can be less occupied, and the image can be displayed more smoothly.

Figure 4:
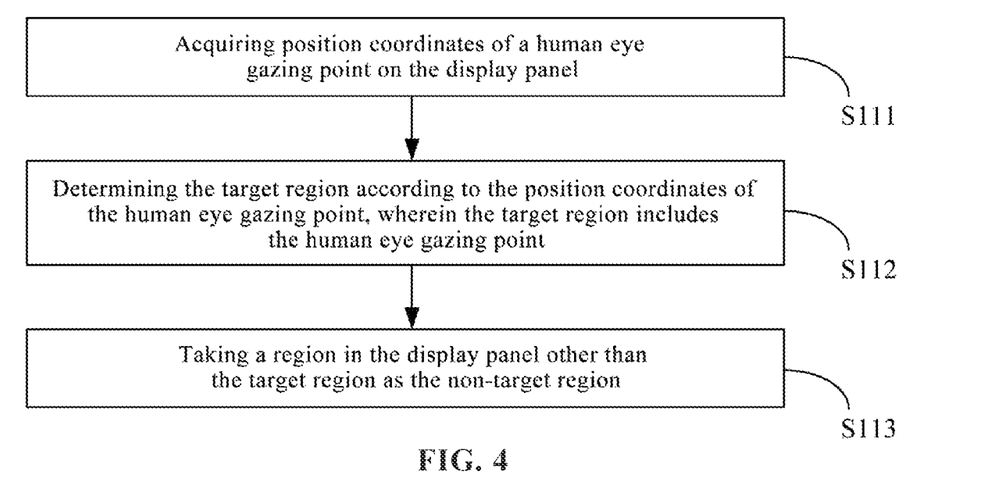
FIG. 4 is a schematic diagram of an alternative embodiment of step S110.

In the present disclosure, how to determine the human eye gazing region is not particularly limited. As an alternative embodiment, as shown in FIG. 4, the step S110 of determining the target region and the non-target region in the display panel may include:

In step S111, acquiring position coordinates of a human eye gazing point on the display panel;

In step S112, determining the target region according to the position coordinates of the human eye gazing point, wherein the target region includes the human eye gazing point;

In step S113, taking a region in the display panel other than the target region as the non-target region.

In the display panel, a predetermined range is extended from the human eye gazing point to the periphery, and the predetermined range is the human eye gazing region. It should be noted that the "human eye gazing point" herein is not a pixel unit, but is a small region occupying a plurality of pixel units. A size of the "human eye gazing point" may be determined according to physiological data of human eyes.

In the present disclosure, how to determine the position of the "human eye gazing point" is not particularly limited. As an alternative embodiment, an under-screen camera may be disposed in the display device including the display panel. Human eye images are collected by the under-screen camera, and the position of the human eye gazing point is determined according to the collected human eye images. Generally, an abscissa of the human eye gazing point is the coordinate of the pixel unit gazed by the human eye, so the abscissa X of the human eye gazing point is generally a column number of the pixel unit corresponding to a center of the human eye gazing point, and an ordinate Y of the human eye gazing point is generally a row number of the pixel unit corresponding to the center of the human eye gazing point.

During the display panel is driven, the pixel units need to be scanned in a forward direction (forward scanning) or a reverse direction (reverse scanning), and data signals are continuously provided to the pixel units through the data lines. Since the data signals are continuously provided, predetermined ranges to the left and right of the human eye gazing point may be taken as left and right boundaries of the human eye gazing region, respectively (for example, twenty columns to the left of the human eye gazing point are the left boundary of the human eye gazing region, and twenty columns to the right of the human eye gazing point are the right boundary of the human eye gazing region).

Since scanning each row of pixel units is a dynamic process, upper and lower boundaries of the human eye gazing region may be determined by the following method:

Where the driving method adopts forward scanning, a row number of a first row of pixel units in the target region is:

$$L1=2\times Lmin\times Y;$$

Where the driving method adopts reverse scanning, the row number of the first row of pixel units in the human eye gazing region is:

$$L1=M-2\times Lmin\times Y-L0,$$

Where L1 is a row number of the first row of pixel units in the human eye gazing region;

Lmin is the number of rows of pixel units occupied by the human eye gazing point;

Y is a row number of a pixel unit corresponding to a central position of the human eye gazing point; and L0 is the number of rows of pixel units occupied by the target region.

L0 in the above refers to a visual range of human eye, and a specific value of L0 may be determined according to the physiological characteristics of human eye. That is, in the present disclosure, L0 may be a data preset in the display device, or a data input into the display device by the viewer according to his own physiological characteristics.

The so-called "forward scanning" means that a scanning signal is sequentially supplied to rows of pixel units from the first row of pixel units in the display panel. The so-called "reverse scanning" means that the scanning signal is sequentially supplied to previous rows of pixel units from a last row of pixel units in the display panel.

Upon the row number of the first row of pixel units in the target region is determined, a row number L2 of the last row of pixel units in the target region is:

$$L2=L1+L0.$$

Similarly, a column number of a first column of pixel units and a column number of a last column of pixel units in the target region may be determined through the visual range of human eyes.

For example, $R1=2\times Rmin\times X$;

$$R2=2\times Rmin\times X+R0,$$

Where R1 is the column number of the first column of pixel units in the target region;

R2 is the column number of the last column of pixel units in the target region;

X is the column number of the pixel unit corresponding to the central position of the human eye gazing point;

Rmin is the number of columns of pixel units occupied by the human eye gazing point;

R0 is the number of columns of pixel units occupied by the target region.

It should be noted that the "first row of the target region" herein refers to when the display panel is in a use state. Accordingly, the last row of the target region refers to the lowest row in the target region 1 when the display panel is in the use state.

In order to improve the display accuracy of the target region, the target region may be scanned row by row while driving the target region to display. In the present disclosure, the requirement on the display effect of the non-target region is low, and in order to reduce power consumption, reduce operation steps, and increase the operation speed of the driving method, as an alternative embodiment, for the non-target region located above and/or below the target region, the scanning signal may be simultaneously provided to a plurality of rows of pixel units at a time, which is specifically described as follows:

The first row of pixel units in the target region is an $A^{th}$ row, and driving pixel units in the non-target region including the $1^{st}$ row of pixel units to an $(A-1)^{th}$ row of pixel units to emit light includes:

Sequentially providing a scanning signal to N number of pixel unit groups in the non-target region including the $1^{st}$ row of pixel units to the $(A-1)^{th}$ row of pixel units, wherein each pixel unit group includes n rows of pixel units, $1<n<A-1$, $N=(A-1)/n$, and n, N and A are all positive integers; and Providing gray scale signals corresponding to the compensated brightness of the pixel units in the non-target region including the $1^{st}$ row of pixel units to the $(A-1)^{th}$ row of pixel units.

It should be noted that it is not to provide the scanning signal to the pixel units first, and then provide the gray scale signals to the pixel units.

A last row of pixels in the target region is a $B^{th}$ row, and the driving pixel units in the non-target region including a $(B+1)^{th}$ row of pixel units to a $M^{th}$ row of pixel units to emit light includes:

Sequentially providing a scanning signal to P number of pixel unit groups in the non-target region including the $(B+1)^{th}$ row of pixel units to the $M^{th}$ row of pixel units, wherein each pixel unit group includes p rows of pixel units, $1<p<M-B-1$, $P=(M-B-1)/p$, M, P, B, p are all positive integers, and M is a total number of rows of pixel units in the display panel; and providing gray scale signals corresponding to the compensated brightness of the pixel units in the non-target region including the $(B+1)^{th}$ row of pixel units to the $M^{th}$ row of pixel units.

In the present disclosure, n may or may not be equal to p. In the present disclosure, specific values of n and p are not particularly limited. As an alternative embodiment, n and p may both be 2.

The scanning manner is explained below with reference to FIGS. 5 and 6. Specifically, the display panel includes a red pixel unit R, a green pixel unit G, and a blue pixel unit B, and a specific arrangement is RGBG.

Figure 5:
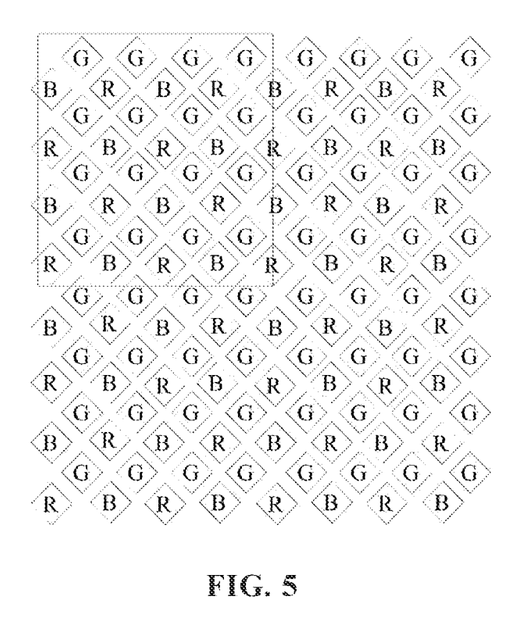
FIG. 5 is a schematic diagram of a distribution of pixels in a target sub-region.
Figure 6:
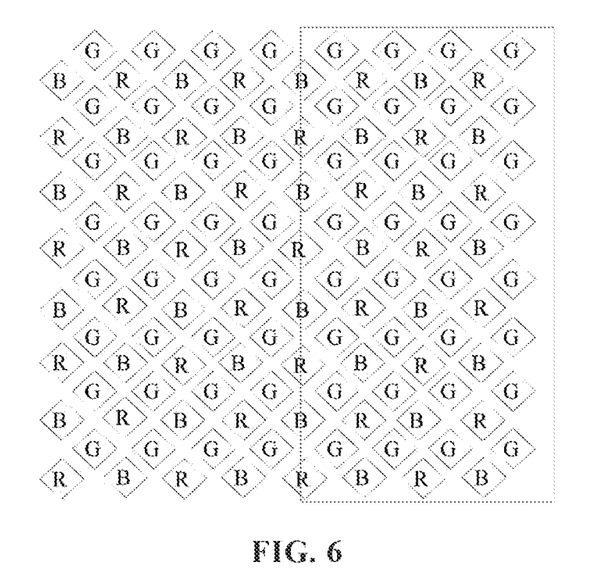
FIG. 6 is a schematic diagram of a distribution of pixels in a non-target sub-region.

FIG. 5 is a distribution diagram of pixel units in the target region, and FIG. 6 is a distribution diagram of pixel units in the non-target region.

In FIG. 5, the target sub-region further includes a blue/red partition corresponding to 2 columns and 4 rows of blue pixel units/red pixel units, and a green partition corresponding to 4 columns and 4 rows of green pixel units.

In FIG. 6, the non-target sub-region further includes a blue/red partitions corresponding to 2 columns and 8 rows of blue pixel units/red pixel units, and a green partition corresponding to 4 columns and 8 rows of green pixel units.

When the target sub-region shown in FIG. 5 is driven to emit light, the pixel units needs to be scanned row by row. While when the non-target sub-region shown in FIG. 6 is driven to emit light, two rows of pixel units may be scanned at a same time.

For the human eye, when a display brightness exceeds a certain critical value, if the brightness continues to increase, the human eye cannot distinguish that. For example, if the display brightness is represented by L0 to L255, the human eye cannot perceive a difference between a brightness L254 and a brightness L255.

In order to simplify the algorithm, as an alternative embodiment, for a pixel in the input image with a gray scale value exceeding a first predetermined value, a brightness compensation value of a corresponding light-emitting unit in the display panel is 0.

Similarly, when the display brightness is below a certain critical value, if the brightness continues to decrease, the human eye cannot distinguish that. For example, if the display brightness is represented by L0 to L255, the human eye cannot perceive a difference between a brightness L1 and a brightness L2.

Also, in order to simplify the algorithm, as an alternative embodiment, for a pixel in the input image with a gray scale lower than a second predetermined value, a brightness compensation value of a corresponding light-emitting unit in the display panel is 0.

In the present disclosure, how to determine the brightness compensation value is not particularly limited. As an alternative embodiment, before the display panel leaves the factory, the actual display brightness of the display panel may be measured in advance, then the brightness compensation value may be determined according to the theoretical brightness of the input image, and the functional relationship between each theoretical brightness and the corresponding brightness compensation value may be stored in the display device. When the driving method is executed, the above functional relationship is directly called, and the brightness compensation value is determined.

As an alternative embodiment, the functional relationship between each theoretical brightness and its corresponding brightness compensation value may be determined by the following steps:

Inputting a pure color test image with a first predetermined gray scale to a display panel, and driving the display panel to display;

Using a camera to photograph a display surface of the display panel, and taking a photographed picture as a first actual display picture;

Calculating a first average brightness value of each pixel unit in the actual display image; and Determining a first brightness compensation value required for the display panel to reach the first predetermined gray scale according to the first predetermined gray scale value of the pure color test image and the first average brightness value.

And then, inputting a pure color test image with a second predetermined gray scale to the display panel according to the above method, and finally determining a second brightness compensation value required for the display panel to reach the second predetermined gray scale.

And repeating the steps until all the brightness compensation values required for the display panel to display all the gray scales are obtained, and then performing function fitting to determine the functional relationship between each theoretical brightness and the corresponding brightness compensation value.

In the present disclosure, how to perform the function fitting is not particularly limited. For example, the function fitting may be performed by a least squares method. Accordingly, the functional relationship may be represented by the following formula:

$$CompenLv = a \times oriLv + b,$$

Where $CompenLv$ is a compensation brightness value; $oriLv$ is the theoretical brightness value; and a and b are compensation parameters, respectively.

In the present disclosure, the compensation parameters may be stored in a memory space of the display device. As an alternative embodiment, the functional relationship may be stored by means of a Look-Up-Table (LUT).

The more the compensation parameters are, the more storage space is occupied for storing the compensation parameters. In order to reduce the occupation of the storage space, a full gray scale may be divided into a plurality of consecutive intervals, the compensation parameters corresponding to the gray scale values in a same interval are the same, and the compensation parameters corresponding to the gray scale values in different intervals are different. In the present disclosure, a length of one interval is not particularly limited, as long as human eyes cannot perceive a difference between the brightness values corresponding to different gray scale values in the same interval.

Accordingly, the driving method further includes, before the step of determining the target region and the non-target region in the display panel, Determining brightness compensation values corresponding to a plurality of gray scale value intervals, respectively, wherein a full gray scale is divided into the plurality of gray scale value intervals, and the plurality of gray scale value intervals are consecutive; and Determining a mapping relationship between each gray scale value interval and the brightness compensation value, according to the brightness compensation values corresponding to gray scale value intervals, respectively.

In the step of determining the brightness compensation value of each target sub-region and the brightness compensation value of each non-target sub-region according to the gray scale value of each pixel in the input image, the brightness compensation value of each target sub-region and the brightness compensation value of each non-target sub-region are determined according to the gray scale value interval where the gray scale value of each pixel is located and the mapping relationship.

The full gray scale refers to 256 numbers of gray scales corresponding to the brightness L0 to L255. In the present disclosure, each gray scale value interval is not particularly limited. For example, each ten gray scales is a gray scale interval. For example, gray scales from a gray scale corresponding to the brightness L0 to a gray scale corresponding to the brightness L10 are a gray scale interval, and so on.

Figure 7:
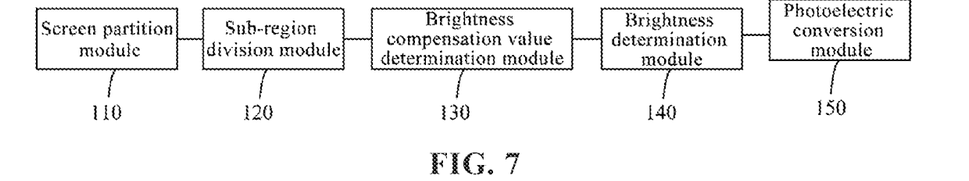
FIG. 7 is a schematic block diagram of a driving apparatus according to an embodiment of the present disclosure.

As a second aspect of the present disclosure, a driving apparatus is provided. As shown in FIG. 7, the driving apparatus includes a screen partition module 110, a sub-region division module 120, a brightness compensation value determination module 130, a brightness determination module 140, and a photoelectric conversion module 150.

The screen partition module 110 is configured to perform step S110, that is, the screen partition module 110 determines a target region and a non-target region in the display panel.

The sub-region division module 120 is configured to perform step S120, that is, the sub-region division module 120 is configured to divide the target region into a plurality of target sub-regions and divide the non-target region into a plurality of non-target sub-regions, where an area of the target sub-region is less than an area of the non-target sub-region.

The brightness compensation value determination module 130 is configured to perform step S130, that is, the brightness compensation value determination module 130 is configured to determine a brightness compensation value of each target sub-region and a brightness compensation value of each non-target sub-region according to the gray scale value of each pixel in the input image.

The brightness determination module 140 is configured to perform step S140, that is, the brightness determination module is configured to determine a compensated brightness of each pixel unit in the display panel according to the gray scale value of each pixel in the input image, the brightness compensation value of each target sub-region, and the brightness compensation value of each non-target sub-region.

The photoelectric conversion module 150 is configured to perform step S150, that is, the photoelectric conversion module 150 is configured to drive each pixel unit in the display panel to emit light according to the compensated brightness of each pixel unit in the display panel.

The driving apparatus is used for performing the driving method, and the principle and the beneficial effects of the driving method have been described in detail above, and are not repeated herein.

Figure 8:
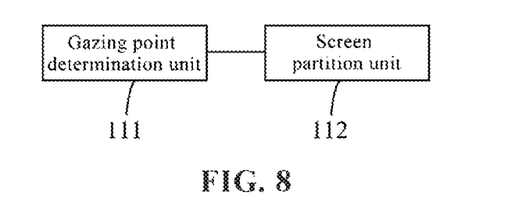
FIG. 8 is a schematic diagram of a screen partition module in a driving apparatus according to an embodiment of the present disclosure.

Alternatively, as shown in FIG. 8, the screen partition module 110 includes a gazing point determination unit 11 and a screen partition unit 112.

The gazing point determination unit 111 is configured to obtain position coordinates of a human eye gazing point on the display panel, and the split-screen unit 112 is configured to determine the target region according to the position coordinates of the human eye gazing point, and take a region in the display panel other than the target region as the non-target region, wherein the target region includes the human eye gazing point.

Alternatively, the screen partition unit is configured to determine the target region according to the following principle:

Where the driving method adopts forward scanning, a row number of a first row of pixel units in the target region is:

$L1=2 \times Lmin \times Y;$

Where the driving method adopts reverse scanning, the row number of the first row of pixel units in the gazing region is:

$L1=M-2 \times Lmin \times Y-L0,$

Where L1 is the row number of the first row of pixel units in the gazing region;

Lmin is the number of rows of pixel units occupied by the human eye gazing point;

Y is a row number of the pixel unit corresponding to a central position of the human eye gazing point;

L0 is the number of rows of pixel units occupied by the target region; and

M is a total number of rows of pixel units in the display panel.

When the display panel is driven to display, pixel units of the display panel need to be scanned row by row through the driving apparatus. Accordingly, as shown in FIG. 9, the driving apparatus further includes a scan module 160.

For one embodiment of the present disclosure, the first row of pixel units in the target region is the $A^{th}$ row of pixel units, and the last row of pixel units in the target region is the $B^{th}$ row of pixel units. In order to reduce power consumption and improve driving speed, for a non-target region including the $1^{st}$ row of pixel units to the $(A-1)^{th}$ row of pixel units, the scan module is configured to sequentially provide the scanning signal to N number of pixel unit groups, where each pixel unit group includes n rows of pixel units, $1<n<A-1$, $N=(A-1)/n$, and n, N and A are all positive integers. Similarly, for a non-target region including a $(B+1)^{th}$ row of pixel units to a $M^{th}$ row of pixel units, the scan module is configured to sequentially provide the scanning signal to P number of pixel unit groups, where each pixel unit group includes p rows of pixel units, $1<p<M-B-1$, $P=(M-B-1)/p$, M, P, B, p are all positive integers, and M is a total number of rows of pixel units in the display panel.

Figure 9:
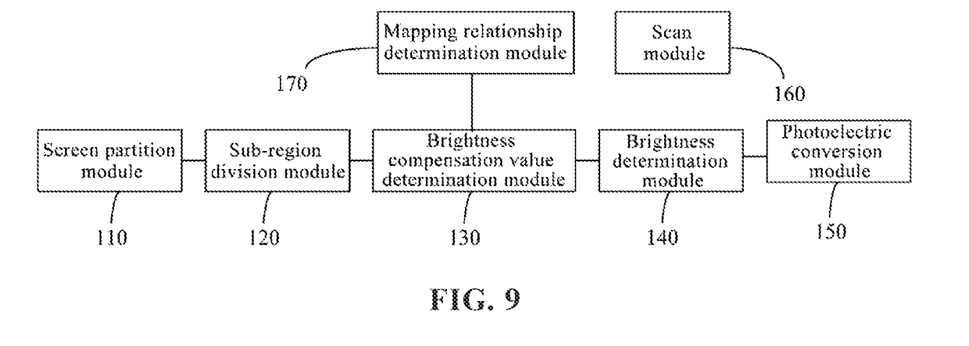
FIG. 9 is a schematic block diagram of a driving apparatus according to another embodiment of the present disclosure.

Alternatively, as shown in FIG. 9, the driving apparatus further includes a mapping relationship determination module 170, which is configured to determine the brightness compensation values corresponding to a plurality of gray scale value intervals, and determine a mapping relationship between each gray scale value interval and the brightness compensation value, according to the brightness compensation value corresponding to each gray scale value interval, wherein the full gray scale is divided into the plurality of gray scale value intervals, and the plurality of gray scale value intervals are consecutive.

Accordingly, the photoelectric conversion module 150 is configured to determine the brightness compensation value of each target sub-region and the brightness compensation value of each non-target sub-region according to the gray scale value interval where the gray scale value of each pixel is located and the mapping relationship.

As a third aspect of the present disclosure, a display device is provided. The display device includes:

a display panel; and a driving apparatus, wherein the driving apparatus is the above driving apparatus provided by the present disclosure.

In the present disclosure, the specific type of the display device is not particularly limited. For example, the display device may be a television, a desktop computer, a laptop computer, a tablet computer, or the like.

Alternatively, the display device may be an AR/VR display device. Since the AR/VR display device has higher resolution and very high requirement on visual effect, the display panel of the display device is driven by using the display method provided by the disclosure, so that a viewer can obtain better display effect, the requirement on hardware can be reduced, and the cost is reduced.

The present disclosure has disclosed exemplary embodiments, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by one of ordinary skill in the art that various changes in form and details may be made therein without departing from the scope of the present disclosure as set forth in the appended claims.

What is claimed is:

1. A driving method of a display panel, comprising:
determining a target region and a non-target region in the display panel;
dividing the target region into a plurality of target sub-regions, and dividing the non-target region into a plurality of non-target sub-regions, wherein an area of each of the plurality of target sub-regions is less than an area of each of the plurality of non-target sub-regions;
determining a brightness compensation value of each of the plurality of target sub-regions and a brightness compensation value of each of the plurality of non-target sub-regions according to a gray scale value of each pixel in an input image;

determining a compensated brightness of each pixel unit in the display panel according to the gray scale value of each pixel in the input image, the brightness compensation value of each of the plurality of target sub-regions and the brightness compensation value of each of the plurality of non-target sub-regions; and driving each pixel unit in the display panel to emit light according to the compensated brightness of the pixel unit in the display panel, wherein the target region is a human eye gazing region.

2. The driving method according to claim 1, wherein the determining the target region and the non-target region in the display panel comprises:

acquiring position coordinates of a human eye gazing point on the display panel;

determining the target region according to the position coordinates of the human eye gazing point, wherein the target region comprises the human eye gazing point; and taking a region in the display panel other than the target region as the non-target region.

3. The driving method according to claim 1, wherein where the driving method adopts forward scanning, a row number of a first row of pixel units in the target region is:

$$L1 = 2 \times Lmin \times Y;$$

where the driving method adopts reverse scanning, the row number of the first row of pixel units in the gazing region is:

$$L1 = M - 2 \times Lmin \times Y - L0,$$

where L1 is a row number of the first row of pixel units in the human eye gazing region;

Lmin is the number of rows of pixel units occupied by the human eye gazing point;

Y is a row number of a pixel unit corresponding to a central position of the human eye gazing point;

L0 is the number of rows of pixel units occupied by the target region; and

M is a total number of rows of pixel units in the display panel.

4. The driving method according to claim 1, wherein the first row of pixel units in the target region is an $A^{th}$ row of pixel units, driving pixel units in a non-target region comprising the first row of pixel units to an $(A-1)^{th}$ row of pixel units to emit light comprises:

sequentially providing a scanning signal to N number of pixel unit groups in the non-target region comprising the first row of pixel units to the $(A-1)^{th}$ row of pixel units, wherein each of the N number of pixel unit groups comprises n rows of pixel units, $1<n<A-1$, $N=(A-1)/n$, and n, N and A are all positive integers; and providing gray scale signals corresponding to the compensated brightness of the pixel units in the non-target region comprising the first row of pixel units to the $(A-1)^{th}$ row of pixel units.

5. The driving method according to claim 1, wherein a last row of pixel units in the target region is a $B^{th}$ row of pixel units, driving pixel units in the non-target region comprising a $(B+1)^{th}$ row of pixel units to a $M^{th}$ row of pixel units to emit light comprises:

sequentially providing a scanning signal to P number of pixel unit groups in the non-target region comprising the $(B+1)^{th}$ row of pixel units to the $M^{th}$ row of pixel units, wherein each of the P number of pixel unit groups comprises p rows of pixel units, $1<p<M-B-1$, $P=(M-B-1)/p$, M, P, B, p are all positive integers, and M is a total number of rows of pixel units in the display panel; and providing gray scale signals corresponding to the compensated brightness of the pixel units in the non-target region comprising the $(B+1)^{th}$ row of pixel units to the $M^{th}$ row of pixel units.

6. The driving method according to claim 1, wherein for a pixel in the input image with a gray scale value exceeding a first predetermined value, a brightness compensation value of a corresponding pixel unit in the display panel is 0.

7. The driving method according to claim 6, wherein for a pixel in the input image with a gray scale lower than a second predetermined value, a brightness compensation value of a corresponding pixel unit in the display panel is 0.

8. The driving method according to claim 1, wherein for a pixel in the input image with a gray scale lower than a second predetermined value, a brightness compensation value of a corresponding pixel unit in the display panel is 0.

9. The driving method according to claim 1, wherein before the determining the target region and the non-target region in the display panel, the driving method further comprises:

determining brightness compensation values corresponding to a plurality of gray scale value intervals, respectively, wherein a full gray scale is divided into the plurality of gray scale value intervals, and the plurality of gray scale value intervals are consecutive; and determining a mapping relationship between each of the plurality of gray scale value intervals and the brightness compensation value, according to the brightness compensation values corresponding to the plurality of gray scale value intervals, wherein the determining the brightness compensation value of each of the plurality of target sub-regions and the brightness compensation value of each of the plurality of non-target sub-regions according to the gray scale value of each pixel in the input image comprises determining the brightness compensation value of each of the plurality of target sub-regions and the brightness compensation value of each of the plurality of non-target sub-regions according to the gray scale value interval where the gray scale value of each pixel is located and the mapping relationship.

10. A driving apparatus, comprising:

a screen partition module configured to determine a target region and a non-target region in a display panel;

a sub-region division module configured to divide the target region into a plurality of target sub-regions, and divide the non-target region into a plurality of non-target sub-regions, wherein an area of each of the plurality of target sub-regions is less than an area of each of the plurality of non-target sub-regions;

a brightness compensation value determination module configured to determine a brightness compensation value of each of the plurality of target sub-regions and a brightness compensation value of each of the plurality of non-target sub-regions according to a gray scale value of each pixel in an input image;

a brightness determination module configured to determine a compensated brightness of each pixel unit in the display panel according to the gray scale value of each pixel in the input image, the brightness compensation value of each of the plurality of target sub-regions and the brightness compensation value of each of the plurality of non-target sub-regions; and a photoelectric conversion module configured to drive each pixel unit in the display panel to emit light according to the compensated brightness of the pixel unit in the display panel, wherein the target region is a human eye gazing region.

11. The driving apparatus of claim 10, wherein the screen partition module comprises:

a gazing point determination unit configured to acquire position coordinates of a human eye gazing point on the display panel; and a screen partition unit configured to determine the target region according to the position coordinates of the human eye gazing point and take a region in the display panel other than the target region as the non-target region, wherein the target region comprises the human eye gazing point.

12. The driving apparatus according to claim 11, wherein the screen partition unit is configured to determine the target region according to the following principle:

where the driving method adopts forward scanning, a row number of a first row of pixel units in the target region is:

$L1=2\times Lmin\times Y;$ where the driving method adopts reverse scanning, the row number of the first row of pixel units in the gazing region is:

$L1=M-2\times Lmin\times Y-L0,$ where L1 is a row number of the first row of pixel units in the human eye gazing region;

Lmin is the number of rows of pixel units occupied by the human eye gazing point;

Y is a row number of a pixel unit corresponding to a central position of the human eye gazing point;

L0 is the number of rows of pixel units occupied by the target region; and

M is a total number of rows of pixel units in the display panel.

13. The driving apparatus according to claim 10, wherein the first row of pixel units of the target region is an $A^{th}$ row of pixel units, the driving apparatus comprises a scan module configured to provide a scanning signal to each row of pixel units, wherein for the non-target region comprising the first row of pixel units to an $(A-1)^{th}$ row of pixel units, the scan module is configured to sequentially provide the scanning signal to N number of pixel unit groups, where each of the N number of pixel unit groups comprises n rows of pixel units, $1<n<A-1$, $N=(A-1)/n$, and n, N and A are all positive integers.

14. The driving apparatus according to claim 10, wherein a last row of pixels in the target region is a $B^{th}$ row of pixel units, the driving apparatus comprises a scan module configured to provide a scanning signal to each row of pixel units, wherein for the non-target region comprising a $(B+1)^{th}$ row of pixel units to a $M^{th}$ row of pixel units, the scan module is configured to sequentially provide the scanning signal to P number of pixel unit groups, where each of the P number of pixel unit groups comprises p rows of pixel units, $1<p<M-B-1$, $P=(M-B-1)/p$, M, P, B, p are all positive integers, and M is a total number of rows of pixel units in the display panel.

15. The driving apparatus according to claim 10, wherein for a pixel in the input image with a gray scale value exceeding a first predetermined value, a brightness compensation value of a corresponding pixel unit in the display panel is 0.

16. The driving apparatus according to claim 15, wherein for a pixel in the input image with a gray scale lower than a second predetermined value, a brightness compensation value of a corresponding pixel unit in the display panel is 0.

17. The driving apparatus according to claim 10, further comprising a mapping relationship determination module configured to determine the brightness compensation values corresponding to a plurality of gray scale value intervals, and determine a mapping relationship between each of the plurality of gray scale value intervals and the brightness compensation value, according to the brightness compensation value corresponding to each of the plurality of gray scale value intervals, wherein a full gray scale is divided into the plurality of gray scale value intervals, and the plurality of gray scale value intervals are consecutive; and the brightness compensation value determination module is configured to determine the brightness compensation value of each of the plurality of target sub-regions and the brightness compensation value of each of the plurality of non-target sub-regions according to the gray scale value interval where the gray scale value of each pixel is located and the mapping relationship.

18. A display device, comprising:

a display panel; and a driving apparatus, which is the driving apparatus according to claim 10.

19. The driving apparatus according to claim 10, wherein for a pixel in the input image with a gray scale lower than a second predetermined value, a brightness compensation value of a corresponding pixel unit in the display panel is 0.

* * * * *